(12) United States Patent
Chandrasekhar et al.

(10) Patent No.: US 6,498,873 B1
(45) Date of Patent: Dec. 24, 2002

(54) PHOTO DETECTOR ASSEMBLY

(75) Inventors: Sethumadhavan Chandrasekhar, Matawan; Andrew Gomperz Dentai, Atlantic Highlands; Barry Franklin Levine, Livingston; Thomas Gordon Beck Mason, Middletown, all of NJ (US); Ola Sjolund, Macungie, PA (US)

(73) Assignee: Agere Systems Inc., Allentown, PA (US)

( * ) Notice: Subject to any disclaimer, the term of this patent is extended or adjusted under 35 U.S.C. 154(b) by 95 days.

(21) Appl. No.: 09/693,787

(22) Filed: Oct. 20, 2000

Related U.S. Application Data

(63) Continuation-in-part of application No. 09/652,573, filed on Aug. 31, 2000, pending.

(51) Int. Cl.[7] .................................................. G02B 6/42
(52) U.S. Cl. ........................... 385/28; 385/27; 385/14; 385/38; 385/43; 385/130; 385/131; 385/88
(58) Field of Search ............................ 385/15, 24, 28, 385/27, 29, 30, 43, 38, 88, 92, 14, 129, 131, 130, 132

(56) References Cited

U.S. PATENT DOCUMENTS

| | | | |
|---|---|---|---|
| 4,763,976 A | * 8/1988 | Nolan et al. | 385/123 X |
| 4,946,239 A | 8/1990 | Garmon | 385/43 |
| 5,193,131 A | 3/1993 | Bruno | 385/14 |
| 5,278,926 A | 1/1994 | Doussiere | 385/26 |
| 5,391,869 A | 2/1995 | Ade et al. | 250/227.24 |
| 5,513,288 A | 4/1996 | Mayer | 385/30 |
| 5,719,976 A | * 2/1998 | Henry et al. | 385/50 |
| 5,787,106 A | 7/1998 | Tabuchi et al. | 372/50 |
| 5,910,012 A | 6/1999 | Takeuchi | 438/31 |
| 5,995,691 A | * 11/1999 | Arai et al. | 385/37 |
| 6,293,688 B1 | * 9/2001 | Deacon | 385/50 X |
| 6,310,995 B1 | * 10/2001 | Saini et al. | 385/28 |
| 6,324,326 B1 | * 11/2001 | Dejneka et al. | 385/123 |
| 6,330,378 B1 | 12/2001 | Forrest et al. | 385/14 |

FOREIGN PATENT DOCUMENTS

DE            196 39 909 A    4/1998    ................ 31/352

OTHER PUBLICATIONS

Euopean Search Report, dated Aug. 10, 2001.
Patent Abstracts of Japan, Publication No. 03045909, vol. 015, No. 192 (P–1202), May 17, 1991 & JP 03 045909 A (Res Dev Corp of Japan), Feb. 27, 1991. Abstract Only.
Bauer, J. G. et al., "High Responsivity Integrated Tapered Waveguide Pin Photodiode," Proceedings of the European Conference on Optical Communication (ECOC), CH, Zurich, Sev, vol. Conf. 19, Sep. 12, 1993, pp. 277–280, XP000492220, figure 3, chapter "Experimental Results.".
Wenger, G. et al., "Highly Efficient Multi–Fiber–Chip Coupling With Large Alignment Tolerances by Integrated INGAASP/INP Spot–Size Transformers," Proceedings of the European Conference on Optical Communication (ECOC), DE, Frankfurt, IGVDE, vol. Conf. 18, Sep. 27, 1992, pp. 927–930, XP000559191, ISBN: 3–8007–1896–7, figure 1, chapter "Experimental Results."
Suzaki, Y. et al., "High Coupling Efficiency and High Responsivity 1.3MUM Light Emission and Detection Diodes with a Butt–Jointed Spot–Size Converter," Electronics Letters, IEE Stevenage, GB, vol. 32, No. 14, Jul. 4, 1996, pp. 1318–1319, XP000624441, ISSN: 0013–5194, figure 1, chapter "Device Structure.".
Mitomi, O. et al., "Optical SPTO–Size Converters for Low–Loss Coupling Between Fibers and Optoelectronic Semiconductor Devices," Journal of Lightwave Technology, US, IEEE, New York, vol. 14, No. 7, Jul. 1, 1996, pp. 1714–1719, XP000598766, ISSN; 0733–8724, figure 1, chapter "Introduction.".

* cited by examiner

*Primary Examiner*—Brian Healy

(57) ABSTRACT

An optical device for coupling an optical signal to an optical detector is disclosed. The optical device includes a mode compression section disposed between an optical input source and a photodetector, which enables efficient coupling between the optical input source and the photodetector.

17 Claims, 3 Drawing Sheets

100

220

220

PHOTO DETECTOR ASSEMBLY

CROSS REFERENCE TO RELATED APPLICATIONS

The present invention is a continuation-in-part application of U.S. patent application Ser. No. 09/652,573, pending, to Chandrasekhar, et al., filed Aug. 31, 2000 and assigned to the assignee of the present invention.

FIELD OF THE INVENTION

The present invention relates generally to an optoelectronic assembly, and particularly to a photodetector assembly.

BACKGROUND OF THE INVENTION

A receiver in an optical communications system incorporates an optical detector. The optical detector converts received optical signals to electrical signals. As the demand for greater transmission rates increases, there is a like demand placed on the speed of the optical detector.

Typical optical detectors have a detecting layer, also referred to as an active or absorber layer, sandwiched between at least two other layers. The active\absorber layer may be an intrinsic (I) layer of semiconductor, which is disposed between a p-doped semiconductor layer and an n-doped semiconductor layer. This structure is commonly referred to as a PIN structure, and the detector as a PIN detector (shown generally in FIG. 9). Optical signals may be incident perpendicularly to the top surface of the detector (shown at 901). This type of detector is referred to as a surface receiving detector. Alternatively, optical signals may be incident perpendicularly to the side of the detector (shown at 902). This is referred to as an edge receiving detector. There are advantages and disadvantages to both types of detectors.

In the surface detector, the area of incidence for an incident optical signal is greater than in the edge detector. This is because the length (l) and width (w) are generally proportionately much greater than the thickness (t) (See FIG. 9). Accordingly, the surface device has a greater amount of light incident on the active\absorber layer, making optical coupling to the active\absorber area more efficient in the surface detector than in the edge detector.

However, the portion of light absorbed by the active area, which recombines to form carriers (referred to as the optical efficiency) depends on the depth the optical signal penetrates into the light absorbing layer. In the surface detector, the penetration depth is limited by the thickness of the active layer.

One way to increase the speed of the detector is by reducing the thickness of the active layer. This reduces the carrier transit time, which is the time it takes a carrier to travel out of the active layer to either the p-type or the n-type layer. The shorter the time required for the carriers to traverse the active layer, the faster the response time. So, a faster transit time results in a faster device. Of course, a thinner active layer limits the depth to which the light can penetrate and thus be absorbed. This may reduce the optical efficiency of the device, making faster surface detectors difficult to realize.

The optical efficiency is intrinsically greater in the edge detector compared to the surface detector. This is because the penetration of light is along the length (l) of the active layer in the conventional structure shown in FIG. 9. This allows a greater penetration depth by the incident light, resulting in a greater degree of absorption. Moreover, the carrier transit time out of the active layer may be reduced by reducing the active layer thickness without diminishing the optical efficiency. Accordingly, due to the orientation of the incident optical signal, the speed of the device may be improved without compromising optical efficiency.

However, there are drawbacks to the edge detector. The edge detector may form a waveguide with the active layer being the guiding layer of the waveguide. Unfortunately, the coupling efficiency of such an edge detector may be poor. The small size of a supported mode (which corresponds to a large far field) in the waveguide of the photodiode makes it difficult to efficiently couple light from some sources, such as optical fibers. Accordingly, only a small portion of the incident light may couple to the edge detector, thus limiting the amount of light absorbed by the detector.

Finally, there are other potential drawbacks associated with edge detecting devices. As is known, device speed may be adversely impacted by junction capacitance. Junction capacitance is directly proportional to the device area. In an edge detector, the area is dependent on the length of the active layer. As such, to reduce the junction capacitance, and thereby improve the device speed, the length of the device may have to be reduced. As a result, the optical efficiency may be compromised in the pursuit of higher device speed. Furthermore, achieving the actual reduction in detector length has its shortcomings. Normally, the device length may be shortened by cutting (or cleaving) the device to a desired length. Unfortunately, cleaving tolerances by present day techniques are often of the same order of magnitude as the desired length of the high-speed device.

Accordingly, what is needed is a high-speed optical detector assembly that has good optical coupling and high internal efficiency.

SUMMARY OF THE INVENTION

The present invention relates generally to an optical device for coupling an optical signal to an optical detector. The present invention includes a mode compression section disposed between an optical input source and a photodetector. The mode compression section which enables efficient coupling between the optical input source and the photodetector.

BRIEF DESCRIPTION OF THE DRAWINGS

The invention is best understood from the following detailed description when read with the accompanying drawing figures. It is emphasized that the various features are not necessarily drawn to scale. In fact, dimensions of the various features may be arbitrarily increased or reduced for clarity of discussion.

DETAILED DESCRIPTION OF THE INVENTION

Figure 1:
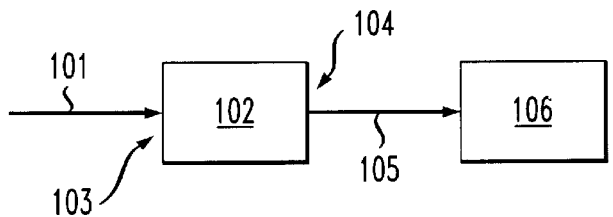
FIG. 1 is a block diagram of an exemplary embodiment of the present invention.

The present invention will be described more fully with reference to accompanying drawing figures in which exemplary embodiments of the present invention are described. Referring initially to FIG. 1, a photodetector assembly 100 in accordance with an illustrative embodiment of the present invention is first described. An input optical mode 101 is incident from an optical source such as an optical fiber (not shown). Generally, the input optical mode 101 has a mode size hat is too large for the mode to directly and efficiently couple to most photodetectors, which support a relatively small mode size. The input optical mode 101 is incident upon the mode compression section 102, which has a first end 103 and a second end 104. The far field pattern of the first end 103 of the mode compression section 102 is small, thereby allowing efficient coupling of the input optical mode to the mode compression section 102. Initially, the input optical mode 101 is loosely confined in the mode compression section 102.

As the input optical mode 101 traverses the mode compression section 102, it is compressed. At the second end 104 of the mode compression section 102, the compressed mode 105 has a relatively small mode size, which enables more efficient coupling to the photodetector 106. Herein lies a useful advantage of the present invention. Generally, the size of the input optical mode 101 from an optical fiber is too large to effectively directly couple to the photodetector 106 (which supports a mode with a relatively small mode size). However, the mode compression section 102 at the first end 103 enables efficient coupling to the fiber, and compression is effected by the mode compression section 102 in order to enable effective coupling of the compressed mode 105 to the photodetector 106.

In general, therefore, the present invention includes a mode compression section 102 disposed between an optical input source (not shown) and a photodetector 106. The mode compression section 102 enables efficient coupling between the input optical source and the photodetector 106. The invention described generally in connection with the embodiment shown in of FIG. 1 can be carried out in a variety of ways. An illustrative embodiment is described in the example below.

EXAMPLE

Figure 2:
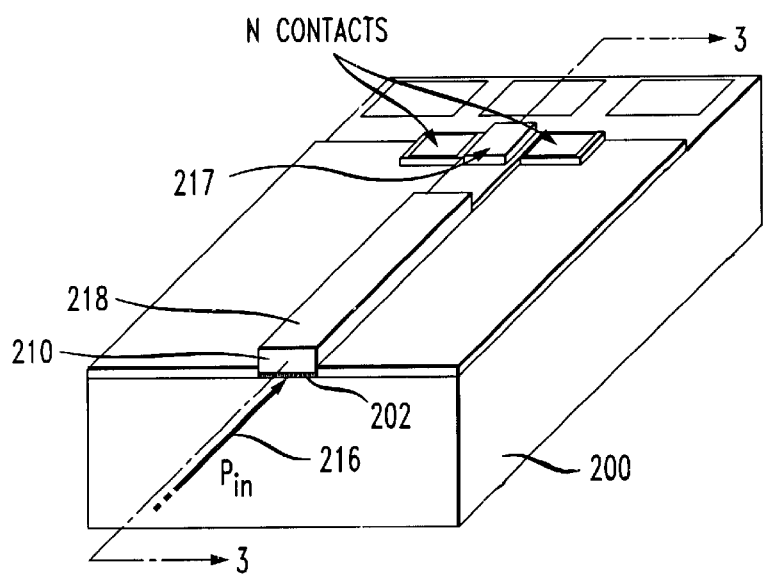
FIG. 2 is a perspective view of an exemplary embodiment of the present invention.
Figure 3:
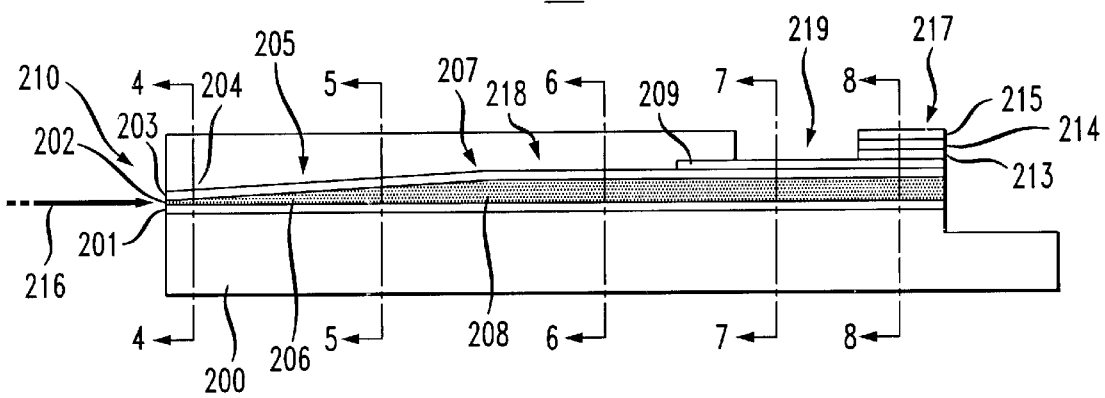
FIG. 3 is a cross-sectional view of an exemplary embodiment of the present invention along line 3—3 in FIG. 2.

Referring initially to FIGS. 2 and 3, a detector assembly 220 in accordance with an illustrative embodiment of the present invention is first described. A lower cladding layer (or substrate) 200 has a first guiding layer 202 disposed thereover. An upper cladding layer 218 is disposed over the first guiding layer 202, resulting in a first waveguide 204. The first waveguide 204 is optically coupled to an intermediate waveguide 205. The intermediate waveguide 205 has an intermediate guiding layer 206 that has a thickness that increases illustratively in a taper as shown. The intermediate guiding layer 206 is disposed between the upper cladding layer 218 and the lower cladding layer 200. A second waveguide 207 has a second guiding layer 208 disposed between the first cladding layer 200 and the second cladding layer 218. The second guiding layer 208 has a substantially uniform thickness.

Towards an end of the second waveguide a mode matching layer 209, is disposed over the upper cladding layer 218. An n-type layer 213 (also referred to as a spacer layer) is disposed over a portion of the mode matching layer 209. An intrinsic (active\absorber) layer 214 is disposed over the n-type layer 213 and a p-type layer 215 is disposed over the intrinsic layer 214. The p-type, intrinsic and n-type layers form a photodetector, illustratively a PIN detector. Finally, it is of interest to note that the lower cladding layer 200 may have one or more layers disposed thereover. These layers, such as layer 201, do not substantially affect the optical properties of the waveguides (204, 205, 207). Illustratively these layers are epitaxial layers of the same material as layer 200. Similarly, there may be one or more epitaxial layers (such as layer 203) disposed between the upper cladding layer 218 and the guiding layers (202,206 and 208). Again, layers such as 203 do not substantially affect the optical properties of the waveguides (204, 205, 207).

An input optical signal 216 is incident on an input or junction plane 210. In the illustrative embodiment, the first, intermediate and second waveguide support one mode, and the detector assembly is a single mode detector. As discussed more fully herein, in the first waveguide 204, the size of a supported mode, determined by the thickness and materials of a waveguide, is relatively large. Accordingly, in the first waveguide 204, the mode is loosely confined, resulting in appreciable coupling of the input optical signal 216 to the first waveguide 204. As the thickness of the intermediate guiding layer 206 increases, the size of the mode decreases (the mode is compressed). Thereby, in the intermediate waveguide 205 mode size becomes smaller and a greater portion of the energy of the mode is confined to the intermediate guiding layer 206. Upon reaching the second waveguide 207, the size of the mode is relatively small, and the mode traversing the second waveguide 207 is strongly confined in the guiding layer 208.

The strongly confined mode traversing the second waveguide 207 is then coupled to the mode matching layer 209 resulting in its being "pulled up" for better coupling to the photodetector 217. The pulling up of the mode by the mode matching layer 209 is a useful aspect of the present invention, enabling evanescent coupling of the mode to the active\absorber layer 214 of the photodetector 217.

A useful aspect of the first waveguide 204 lies in its ability to couple to optical sources which have a small far field pattern. Typical optical input sources, such as optical fibers, have relatively small far field patterns. The far field patterns in the directions parallel and perpendicular to the junction plane (e.g., 210) indicate the angular spread of the optical mode. As is known, the smaller the far field pattern, the larger the mode size. In order to more efficiently couple the mode from the input source, such as an optical fiber, to another waveguide, the far field patterns of the input source and the waveguide must be similar. Accordingly, the waveguide to which the optical fiber is coupled should be capable of supporting a mode having a relatively large size.

This results in better mode matching, and ultimately in better optical coupling.

In the illustrative embodiment, the input optical signal 216 is from an optical fiber. The input far field pattern of an optical fiber has a transverse far field angle of approximately six degrees, measured from the center axis of the guiding layer of the fiber, the core. The first waveguide 204 has an illustrative transverse far field angle in the range of approximately eight degrees to approximately fifteen degrees for the full width at half maximum (FWHM), providing a similar far field pattern as the fiber. Accordingly, more efficient optical coupling between the input optical signal 216 and the first waveguide 204 is realized by virtue of the illustrative embodiment of the present invention. The mode is then compressed in the intermediate waveguide 205, so that efficient coupling to the photodetector may be achieved.

As can be appreciated, the compression mode section (referenced above in connection with the embodiment shown in FIG. 1) of the illustrative embodiment shown in FIGS. 2 and 3 comprises the first waveguide 204, the intermediate waveguide 205 and the second waveguide 207. Moreover, it may include the mode matching region 219 and the spacer layer 213. The size of the mode from an optical fiber is too large to effectively directly couple to the photodetector 217 (which supports a mode with a relatively small mode size). However, the first waveguide 204 enables efficient coupling to the fiber, and compression is effected by the intermediate waveguide 205 in order to enable effective coupling of the mode to the detector 217.

In the illustrative embodiment, the photodetector has a detection wavelength of 1.55 μm. As such, guiding layer 202 of the first waveguide 204 is a layer of quaternary material, such as InGaAsP or InGaAlAs, having a bandgap wavelength of approximately 1.1 μm. The lower guiding layer 202 in the illustrative embodiment has a thickness in the range of 0.075 μm to 0.15 μm disposed between the lower cladding layer 200 and the upper cladding layer 218. Illustratively, the lower cladding layer 200 is n-InP having a thickness of 1 μm; and the upper cladding layer 218 is n-InP having a thickness in the range of 2 μm to 3 μm, and a width of approximately 5 μm. The first guiding layer 202 has an illustrative index of refraction of 3.273; and the lower and upper cladding layers (200,218) have an index of refraction of 3.168. The lower cladding layer 201, the upper cladding layer 218 and the first guiding 202 are fabricated by standard technique, such as metal organic chemical vapor deposition (MOCVD) or molecular beam epitaxy (MBE).

Figure 4:
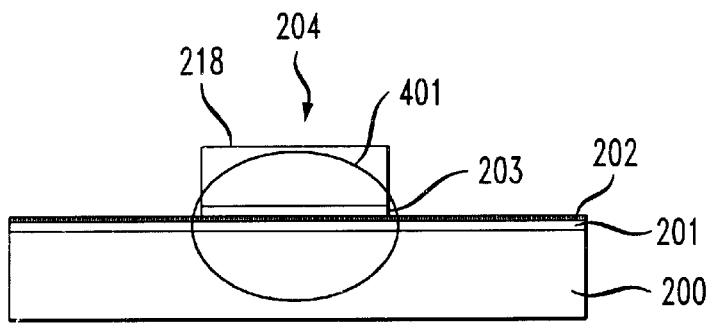
FIG. 4 is a cross-sectional view of an illustrative embodiment of the present invention along line 4—4 in FIG. 3, showing the optical mode loosely confined in the first waveguide section.

Turning to FIG. 4, an exemplary mode 401 is shown in the first waveguide 204. The mode 401 is loosely confined to the first guiding layer 202. That is, a significant portion of the energy of the mode is in the upper cladding layer 218 and the lower cladding layer 200. This is a useful aspect of the present invention. As stated, the small far field pattern of the first waveguide 204 translates to loose confinement of the input optical signal 216, and a comparatively large mode size in the first waveguide 204.

Figure 5:
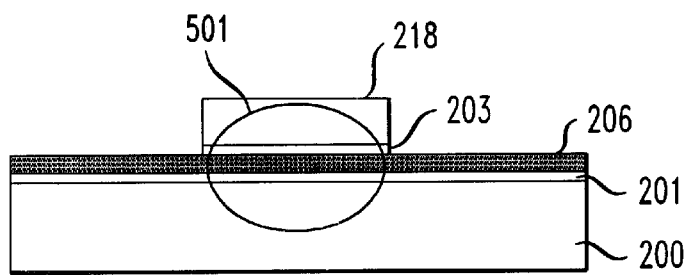
FIG. 5 is a cross-sectional view of an illustrative embodiment of the present invention along line 5—5 in FIG. 3, showing compression of the optical mode in the intermediate waveguide section of the present invention.

The mode is then more tightly confined in the intermediate guiding layer 206 of the intermediate waveguide 205. The reduction in the size of the mode is accomplished by increasing the thickness of the guiding layer 206. This is shown in FIG. 5, which is a cross-sectional view of the optical mode 501 in the intermediate waveguide 205. In the intermediate waveguide 205, the thickness of the intermediate guiding layer 206 increases, resulting in a gradual decrease in the mode size of optical mode 501 as it traverses the intermediate waveguide 205 towards the second waveguide 207.

Along the length of the intermediate waveguide 205, the thickness of the intermediate guiding layer 206 increases from on the order of approximately 0.075 μm to approximately 0.15 μm (the thickness of the first guiding layer) to on the order of approximately 0.17 μm to approximately 0.34 μm (the thickness of the second guiding layer 208). The materials chosen for the intermediate guiding layer 206, and the cladding layers 200 and 218 are illustratively the same as those of the first waveguide. However, while it is true that in the illustrative embodiment the indices of refraction of the first guiding layer 202 and the intermediate guiding layer 206 are the same, it is possible to change the index of refraction of the intermediate guiding layer 206, if desired.

It is useful to mention that the intermediate waveguide 205 is illustratively fabricated by a technique known as selectively area growth (SAG) (this technique is also referred to as patterned area growth). Known in the art, SAG may be achieved by a variety of vapor crystal growth techniques such as metal organic chemical vapor deposition (MOCVD) and molecular beam epitaxy (MBE). The SAG technique utilizes the phenomenon that the presence of an area covered with a dielectric mask (such as silicon dioxide mask) causes a rate of growth of a semiconductor layer on an exposed area to vary depending on the width of the surrounding dielectric mask. The result is that the thickness of the semiconductor layer varies. Moreover, the technique lends itself to varying the stoichiometry of the grown layer. This can be used to change the bandgap wavelength and the index of refraction of the grown layer. As such, the index of refraction of layer 206 may be different than in layers 204 and 208, if desired.

The SAG growth technique may be used to fabricate the intermediate guiding layer 206 having the increasing thickness along it length as discussed above. The SAG technique is useful in increasing the thickness of the intermediate guiding layer along its length. The thickness of the intermediate guiding layer may be increased by a factor of approximately 1.5 to approximately 3 times, while substantially avoiding the formation of dislocations. In the present exemplary embodiment, the intermediate guiding layer 206 thickness increases by a factor of 2.25 along its length (as shown in FIG. 3). As such, the second guiding layer has a thickness that is approximately 2.25 times greater than that of the first guiding layer in this illustrative embodiment.

Figure 6:
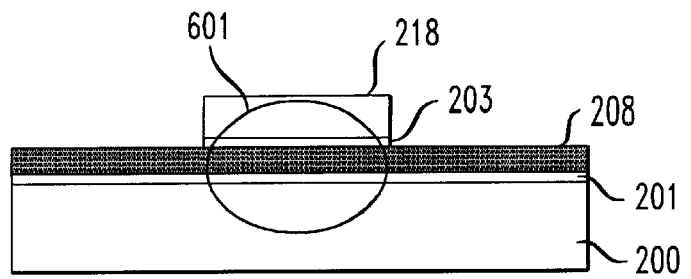
FIG. 6 is a cross-sectional view of an illustrative embodiment of the present invention along line 6—6 in FIG. 3, showing the optical mode strongly confined in the second waveguide section of the present invention.

Turning to FIG. 6, a cross-sectional view of the optical mode 601 is shown in the second waveguide 207. As discussed above, by choosing the thickness of the second guiding layer 208 and the indices of refraction of the lower and upper cladding layers (200, 218, respectively) as well as of the guiding layer 208, the degree of confinement of the optical mode 601 may be selected. In the second waveguide 206 of the illustrative embodiment, this may be accomplished by the suitable choice of the thickness of the second guiding layer 208. Illustratively, the second guiding layer 208 has a thickness in the range of 0.17 μm to 0.34 μm. The materials chosen for the second guiding layer 208 and the cladding layers (200, 218) in the second waveguide 206 are the same in this waveguide as in the first waveguide 204 in the exemplary embodiment. Thereby the indices of refraction are as well. Moreover the fabrication techniques are the same. As a result of the mode compression sequence, the optical mode, which was a loosely confined mode in the first waveguide 204 is more tightly confined in the second waveguide 207. Ultimately, this allows good optical coupling of the input mode to the photodetector.

Figure 7:
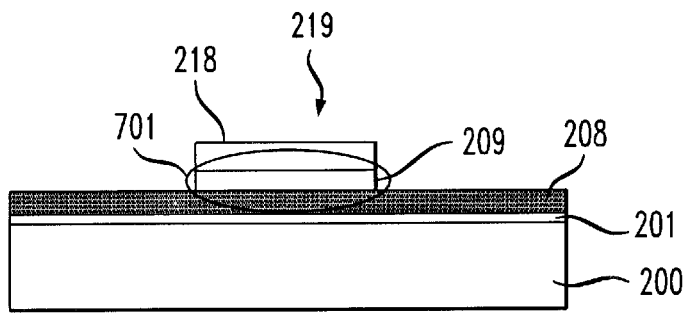
FIG. 7 is a cross-sectional view of an illustrative embodiment of the present invention along line 7—7 in FIG. 3 showing mode pull-up using a mode matching layer for coupling to the photodetector.

Turning to FIG. 7, a cross-sectional view of the optical mode 701 in the mode matching region 219 of the illustrative embodiment is shown. It is of interest to note that in a portion of the mode matching region 219, the upper cladding layer 218 may be omitted (reference FIG. 3). The mode matching layer 209 fosters the "pulling up" of the optical mode 701 so that more efficient evanescent coupling to the photodetector is achieved. To this end, as the mode 701 traverses the second waveguide 207, a portion of the mode is in the upper cladding layer 218. This portion of the mode then traverses the mode matching layer, which has a greater index of refraction than the second cladding layer 203. Accordingly, the phase velocity of mode 701 in the mode matching layer 209 is lower than in the second cladding layer 203, and the pulling up and collapsing (or compression) of the mode into the mode matching layer occurs. The mode matching layer 209 then has a layer with a lower index of refraction thereover (illustratively air or InP), and the mode is guided by the waveguide formed by the second cladding layer 218, the mode matching layer 209 and the third cladding layer of air or InP.

Illustratively, the mode matching section 219 includes a mode matching layer 209 of InGaAsP having a thickness of approximately 0.35 μm and an index of refraction on the order of approximately 3.405. This mode matching layer 209 is fabricated by a standard technique such as MOCVD or MBE. Moreover, a layer of n-InP known as a spacer layer 213 may be disposed over a portion of the mode matching layer.

This layer has an index of refraction of illustratively 3.168 and an illustrative thickness of 0.1 μm. The spacer layer may be useful in preventing the mode from coupling spatially too soon into the absorber layer 214, resulting in undesired scattering and potentially compromising the evanescent coupling to the active\absorber layer 214 of the photodetector.

Figure 8:
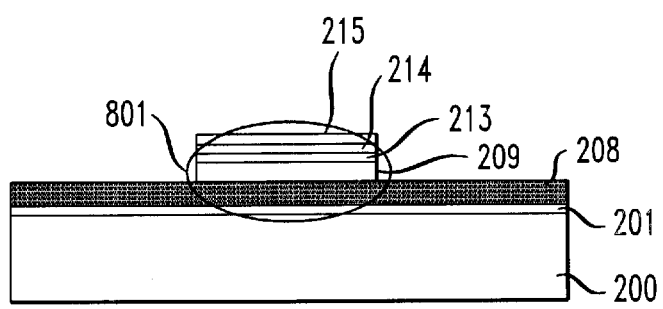
FIG. 8 is a cross-sectional view of an illustrative embodiment of the present invention along line 8—8 in FIG. 3 showing the optical mode's being coupled to the photodetector.
Figure 9:
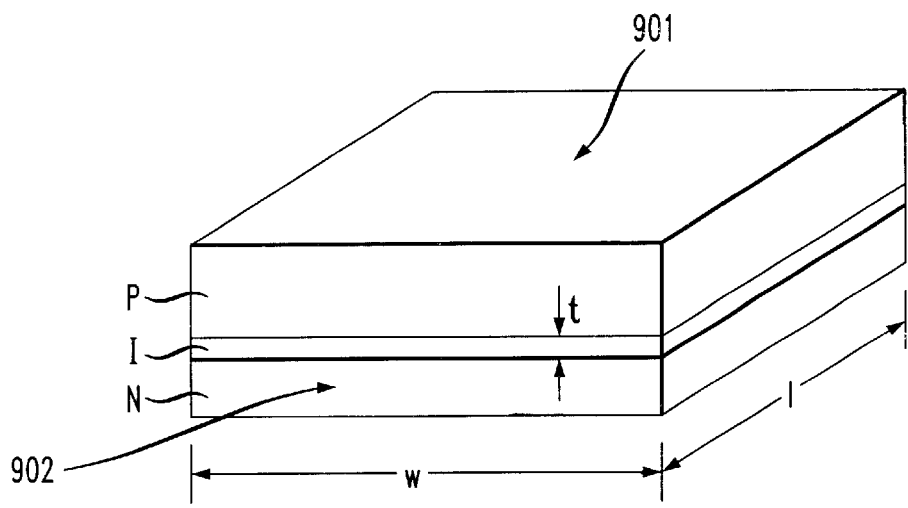
FIG. 9 is a perspective view of a conventional PIN structure.

Turning to FIG. 8, the absorption of the optical signal at the photodetector is shown in cross-section. The mode 801 has a small mode size, and is in suitable position from the pull up action of the mode matching layer 209 to be evanescently coupled to the active\absorber layer 214 of the photodetector. A significant portion of the optical energy of the optical mode is confined in the waveguide having the mode matching layer 209 as its guiding layer.

The active\absorber layer 214 is chosen to have a greater index of refraction than the mode matching layer 209. Illustratively, the active\absorber layer 214 is InGaAs having an index of refraction of 3.56. The p-type layer 215 illustratively has the same index of refraction as the n-type layer 213 (illustratively 3.168), and a detector waveguide results. Because of the higher index of refraction of the active\absorber layer 214, a pull up action described in connection with the mode matching layer 209 occurs. The small size of the mode achieved by the mode compression of the present invention, combined with the close proximity of the mode to the absorber layer 214 achieved by the pull-up of the mode, enables efficient evanescent coupling to the absorber layer 214. This fosters good coupling efficiency with the detector, and as a result, a high quantum efficiency. The resultant structure enables a coupling efficiency on the order of 90%. Moreover, because the structure of the present invention allows for a relatively thin active\absorber layer in the detector, while having a relatively high optical coupling to the detector, the speed of the device is significantly greater than conventional detectors.

The active\absorber layer is an undoped or "intrinsic" InGaAs layer which has a bandgap energy of 0.75 eV, which is lower than the photon energy of the incoming light. The photons are absorbed generating electron and hole pairs. The holes are swept out of the absorber to the p doped upper cladding and the electrons are collected at the n side. In the illustrative embodiments described above, a 1.55 μm detector is realized for use at speeds of 40 Gbit/sec and higher.

While the above materials and dimensions are illustrative and specific to a 1.55 μm detector, clearly the present invention may be realized using a variety of materials and may be employed for other detector wavelengths. Illustratively, a 980 nm detector could have been used. In this case, the first, intermediate and second guiding layers (202, 206, 208, respectively) could be GaAs. The upper and lower cladding layers could be AlGaAs. In fact, a general rule may be applied to effect efficient coupling to the first waveguide 204 (and thereby the mode confinement sequence of the present invention), for a variety of applications and materials. To this end, the combinations of the thickness of the guiding layer and the indices of refraction of the guiding and cladding layers dictate the degree of confinement of the supported mode of the first waveguide (and of course for the intermediate and second waveguides). To determine the parameters for a given application, applicants use the normalized frequency or V-number:

$$V=(2\pi/\lambda)(n_{fgl}^2-n_c^2)^{1/2}(t_{fgl})$$

where λ is the wavelength of the absorbed light, $n_{fgl}$ is the index of refraction of the first guiding layer; $n_c$ is the index of refraction of the cladding layer (either the upper or the lower cladding layer); and $t_{fgl}$ is the thickness of the first cladding layer. To fabricate the first waveguide 204 of the present invention, applicants have found that the V should be in the range of approximately 0.25 to approximately 0.6. Once the first waveguide materials and dimensions are determined, the thickness of the second guiding layer 208 is determined. As described above, by the fabrication techniques of the exemplary embodiments, the thickness of the second guiding layer is on the order of approximately 1.5 to approximately 3.0 times that of layer 202, with suitable increase in thickness of the intermediate waveguide layer 206.

Illustratively, in the first waveguide 204, the bandgap wavelength of guiding layer 202 is in the range of approximately 1.0 μm to approximately 1.2 μm. In the case of a 1.0 μm bandgap wavelength material for the guiding layer 202, the thickness would be in the range of approximately 0.15 μm to approximately 0.3 μm. In the case of a 1.1 μm bandgap wavelength for the guiding layer 202, the guiding layer can have a thickness in the range of approximately 0.075 μm to approximately 0.15 μm. In the event that the bandgap wavelength is 1.2 μm, the thickness of layer 202 would be approximately 0.05 μm to approximately 0.1 μm.

As discussed in detail above, a useful aspect of the present invention lies in its ability to efficiently optically couple relatively large incident modes from typical sources such as optical fibers, and to compress the incident mode to foster efficient coupling to a photodetector. The present invention discloses illustrative techniques to effect the invention. However, as will be readily apparent to one of ordinary skill in the art having had the benefit of the present disclosure, it is possible to realize the present invention as set forth in the appended claims, using other materials and structures. For example, the choice of detector wavelength will dictate types and thickness of materials to effect the coupling to the first waveguide 204; mode compression in the intermediate waveguide 205; mode coupling to the second waveguide 207; pull-up of the mode in the mode matching section 219; and evanescent coupling to the photodetector 216. Accordingly, the present disclosure sets forth illustrative embodiments of the invention. Clearly, the mode confinement sequence of the present invention, to improve coupling to a detector through the use of alternative materials, structures and dimensions are possible.

What is claimed:

1. An optical device, comprising
   a first waveguide capable of supporting an optical mode having a first mode size in said first waveguide;
   a second waveguide optically coupled to said first waveguide, said second waveguide capable of supporting said optical mode, said optical mode having a second mode size in said second waveguide, wherein said second mode size is smaller than said first mode size;
   an optical detector; and
   a mode matching section optically coupled between said second waveguide and said optical detector.

2. An optical device as recited in claim 1, wherein an intermediate waveguide is disposed between said first and said second waveguide.

3. An optical device as recited in claim 2, wherein said intermediate waveguide has a length and a said mode has a varying mode size along said length.

4. An optical device as recited in claim 3, wherein said intermediate waveguide has an intermediate guiding layer, and said intermediate guiding layer has a thickness that increases along said length.

5. An optical device as recited in claim 1, wherein said first waveguide has a first guiding layer with a first thickness and a second guiding layer with a second thickness, and said second thickness is greater than said first thickness.

6. An optical device as recited in claim 3, wherein said second thickness is in the range of approximately 1.5 to approximately 3.0 times greater than said first thickness.

7. An optical device as recited in claim 1, wherein said optical mode is evanescently coupled to said detector.

8. An optical device as recited in claim 1, wherein said mode matching section further comprises a mode matching layer, and said mode matching layer couples said optical mode to said detector.

9. An optical device as recited in claim 1, wherein said first waveguide has a transverse far field in the range of approximately 8 degrees to approximately 15 degrees.

10. An optical device as recited in claim 2, wherein said intermediate waveguide has a first end adjacent said first waveguide and a second end adjacent said second waveguide; and
    said first waveguide has a first guiding layer with a first thickness at said first end, and a second thickness at a second end.

11. An optical device as recited in claim 10, wherein said first thickness is smaller than said second thickness.

12. An optical device as recited in claim 10, wherein said second thickness is in the range of approximately 1.5 to approximately 3.0 times greater than said first thickness.

13. An optical device as recited in claim 1, wherein an intermediate waveguide is adjacent on a first end to said first waveguide and on a second end to said second waveguide; and
    said intermediate waveguide has a guiding layer and said guiding layer has a thickness that is smaller on said first end than on said second end.

14. An optical device as recited in claim 1, wherein said first waveguide further comprises a first guiding layer disposed between a first cladding layer and a second cladding layer, and said guiding layer has a thickness in the range of approximately 0.075 to approximately 0.15 $\mu$m.

15. An optical device as recited in claim 1, wherein said first waveguide has a first guiding layer and said first guiding layer is a quaternary III-V semiconductor.

16. An optical device as recited in claim 15, wherein said quaternary III-V semiconductor has a bandgap wavelength in the range of approximately 1.0 $\mu$m to approximately 1.2 $\mu$m.

17. An optical device as recited in claim 1, wherein said first waveguide has an V-number in the range of approximately 0.25 to approximately 0.6.

* * * * *